(12) United States Patent
Ahn et al.

(10) Patent No.: US 11,351,658 B2
(45) Date of Patent: Jun. 7, 2022

(54) ERGONOMIC FRAME-FILLER PLACEMENT TOOL FOR MANUAL INSTALLATION

(71) Applicant: The Boeing Company, Chicago, IL (US)

(72) Inventors: Jonathan Y. Ahn, Seattle, WA (US); Davis Tran, Seattle, WA (US); Silas L. Studley, Redmond, WA (US); Chace Wilcoxson, Kent, WA (US); Long H. Ly, Renton, WA (US); Darrell D. Jones, Mill Creek, WA (US); Robert Whiting, Marysville, WA (US)

(73) Assignee: The Boeing Company, Chicago, IL (US)

( * ) Notice: Subject to any disclaimer, the term of this patent is extended or adjusted under 35 U.S.C. 154(b) by 273 days.

(21) Appl. No.: 16/432,186

(22) Filed: Jun. 5, 2019

(65) Prior Publication Data

US 2020/0384701 A1    Dec. 10, 2020

(51) Int. Cl.
| | | |
|---|---|---|
| B25B 11/00 | (2006.01) | |
| B29C 65/00 | (2006.01) | |
| B64C 1/06 | (2006.01) | |
| B29C 70/88 | (2006.01) | |
| B64F 5/10 | (2017.01) | |
| B25G 1/10 | (2006.01) | |

(52) U.S. Cl.
CPC ............ B25B 11/005 (2013.01); B25G 1/102 (2013.01); B29C 66/82661 (2013.01); B29C 70/887 (2013.01); B64C 1/061 (2013.01); B64C 1/068 (2013.01); B64F 5/10 (2017.01)

(58) Field of Classification Search
CPC ..................................................... B25B 11/005
USPC ........................................................... 269/21
See application file for complete search history.

(56) References Cited

U.S. PATENT DOCUMENTS

| | | | | |
|---|---|---|---|---|
| 4,945,604 | A  * | 8/1990 | Miner ........................ | A47L 5/14 15/344 |
| 6,260,232 | B1 * | 7/2001 | Nelson ....................... | A47L 9/02 15/321 |
| 6,419,291 | B1 * | 7/2002 | Preta .................. | A61B 17/22031 294/119.3 |
| 2017/0258283 | A1 * | 9/2017 | Hardin ..................... | A47L 7/009 |

* cited by examiner

Primary Examiner — Lee D Wilson
Assistant Examiner — Jonathan G Santiago Martinez
(74) Attorney, Agent, or Firm — Quinn IP Law

(57) ABSTRACT

An ergonomic frame-filler placement tool is manually operable to supply a vacuum fluid flow at a distal end of the tool that can be used by a worker to pick up and hold a piece of frame-filler material to the distal end of the tool, which enables the worker to manipulate the tool to position the piece of frame-filler material over a desired location of a fuselage mandrel and then manually stop the vacuum fluid flow at the distal end of the tool to position the piece of frame-filler material at the desired location on the mandrel.

18 Claims, 4 Drawing Sheets

ERGONOMIC FRAME-FILLER PLACEMENT TOOL FOR MANUAL INSTALLATION

FIELD

This disclosure pertains to the construction and method of operation of an ergonomic frame-filler placement tool. More specifically, this disclosure pertains to the construction of an ergonomic frame-filler placement tool that is manually operable to supply a vacuum fluid flow at a distal end of the tool that can be used by an operator to pick up and hold a piece of frame-filler material to the distal end of the tool, which enables the operator to manipulate the tool to position the piece of frame-filler material over a desired location of a fuselage mandrel and then manually stop the vacuum fluid flow at the distal end of the tool to position the piece of frame-filler material at the desired location on the mandrel.

BACKGROUND

In the composite construction of aircraft, and in particular in the composite construction of the fuselage of the aircraft, a large fuselage mandrel 12 similar to that represented in FIGS. 1 and 2 is often used. The fuselage mandrel 12 is basically used as a mold on which a portion of the aircraft fuselage is constructed. As represented in FIGS. 1 and 2, the fuselage mandrel 12 used to construct a portion of the aircraft fuselage has a general, semi-cylindrical exterior surface 14. A plurality of grooves 16 are formed in the exterior surface 14. The grooves 16 will form reinforcing stringers in the portion of the aircraft fuselage constructed on the fuselage mandrel 12. In some methods of constructing the aircraft fuselage from composite materials, frame-fillers are positioned on the exterior surface 14 of the fuselage mandrel 12 between adjacent grooves 16. The frame-fillers are themselves constructed of composite material, for example carbon fiber filament reinforced material. The frame fillers vary in size and shape to fit into the various different size and shape voids between adjacent grooves 16 in the exterior surface 14 of the fuselage mandrel 12.

Because frame-fillers vary in size and shapes, it is difficult to fully automate the process of positioning the frame fillers in their desired locations on the exterior surface 14 of the fuselage mandrel 12.

Currently, frame-fillers 18 are positioned in their desired locations on the exterior surface 14 of the fuselage mandrel 12 by hand. In manually positioning the frame-filler material 18, often it is necessary for a worker 22 standing on a work platform 24 adjacent the exterior surface 14 of the fuselage mandrel 12 to manually lean over the exterior surface 14 to install a piece of frame-filler material 18 in its desired position on the exterior surface 14. Alternatively, the worker 22 could position themselves on their stomach on a rainbow (curving) lift/ladder to manually position the frame-filler material 18 in its desired position on the exterior surface 14 of the fuselage mandrel 12. The current requirement for the worker 22 to manually lean over the exterior surface 14 of the fuselage mandrel 12 or lay on their stomach on the exterior surface 14 to install the frame-filler 18 in its desired position pushes the limitations of safe ergonomics.

SUMMARY

The ergonomic frame-filler placement tool for manual installation of frame-filler material described in this disclosure enables a worker to pick up frame-filler material at a distal end of the tool by a vacuum fluid flow at the distal end of the tool that is activated by a control device on the tool. The worker can then manipulate the tool to position the frame-filler material over a desired location on the exterior surface 14 of the fuselage mandrel 12 to place the frame-filler material at the desired location. The worker then operates the control device to stop the vacuum fluid flow at the distal end of the tool and enable the frame-filler material to drop onto the desired location on the exterior surface 14 of the fuselage mandrel 12. The worker can also operate the control device to supply a fluid flow out of the distal end of the tool to separate the frame-filler material from the distal end of tool at the desired location on the exterior surface 14 of the fuselage mandrel 12. The worker can further position the frame-filler material at the desired location on the exterior surface 14 of the fuselage mandrel 12 by manipulating the frame-filler material with the distal end of the tool.

The ergonomic frame-filler placement tool enables the worker to remain upright and in a neutral, safe position on the support surface 24 while placing frame-filler materials onto the exterior surface 14 of the fuselage mandrel 12, eliminating the need for the worker to lean over or lay over the exterior surface 14 of the fuselage mandrel 12.

The ergonomic frame-filler placement tool for manual installation of frame-filler material is basically a rod having an elongate length with a proximal end and a distal end at opposite ends of the rod. The length of the rod is adjustable, with the proximal end of the rod and the distal end of the rod being moveable together to decrease the length of the rod, and with the proximal end of the rod and the distal end of the rod being movable apart to increase the length of the rod. The rod has a telescoping section that enables the length of the rod to be adjusted. The rod also has a bendable portion adjacent the distal end of the rod. The bendable portion of the rod enables the rod to be moved between a straight configuration where the proximal end of the rod and the distal end of the rod are aligned along a straight line through the rod, and a bent configuration where the proximal end of the rod and the distal end of the rod are not aligned along the straight line through the rod.

A conduit extends along the length of the rod between the proximal end of the rod and the distal end of the rod. The conduit has a proximal end adjacent the proximal end of the rod and the conduit has a distal end adjacent the distal end of the rod. The conduit provides a fluid high flowpath between the proximal end of the rod and the distal end of the rod.

A head is mounted on the distal end of the rod. The head is attached to the distal end of the rod by a moveable connection that enables the head to be moved relative to the distal end of the rod. The head has a flat, central surface that is configured for engagement with a piece of frame-filler material. The head has a peripheral edge surface adjacent the central surface. The peripheral edge surface has a curved configuration that curves away from the central surface of the head and toward the distal end of the rod. There is at least one hole through the surface of the head, and preferably a plurality of holes through the central surface of the head. The plurality of holes through the central surface of the head communicate with the distal end of the conduit.

A source of vacuum pressure communicates with the proximal end of the conduit. The source of vacuum pressure is operable to supply vacuum pressure to the proximal end of the conduit and create a vacuum fluid flow into the distal end of the conduit and create a vacuum fluid flow into the plurality of holes through the central surface of the head. The source of vacuum pressure is also operable to stop the supply of vacuum pressure to the proximal end of the conduit and stop the vacuum fluid flow into the distal end of the conduit and into the plurality of holes through the central surface of the head.

A source of fluid pressure communicates with the proximal end of the conduit. The source of fluid pressure is operable to supply fluid pressure to the proximal end of the conduit and create a fluid flow out of the distal end of the conduit and out of the plurality of holes through the central surface of the head.

A control device is provided on the rod. The control device communicates with the source of vacuum pressure and with the source of fluid pressure. The control device is operable to selectively control communication of the source of vacuum pressure with the proximal end of the conduit and with the plurality of holes through the central surface of the head, and communication of the source of fluid pressure with the proximal end of the conduit and with the plurality of holes through the central surface of the head. The control device is also operable to stop the supply of vacuum pressure to the proximal end of the conduit and stop the vacuum fluid flow through the plurality of holes through the head.

When the central surface of the head is engaged with a piece of frame-filler material, operating the control device to selectively control the source of vacuum pressure to supply vacuum pressure to the proximal end of the conduit creates a vacuum fluid flow into the plurality of holes through the central surface of the head that holds the piece of frame-filler material to the surface of the head. Operating the control device to selectively control stopping the supply of vacuum pressure to the proximal end of the conduit and stopping the vacuum fluid flow into the plurality of holes through the central surface of the head releases the hold of the piece of frame-filler material to the central surface of the head. Furthermore, operating the control device to control communication of the source of fluid pressure to supply a fluid flow to the proximal end of the conduit creates a fluid flow through the distal end of the conduit and through the plurality of holes through the central surface of the head to insure the piece of frame-filler material separates from the head.

A camera is supported on the rod adjacent the distal end of the rod. The camera communicates with a display screen. The camera is operable to display on the display screen images of an environment adjacent to the central surface of the head.

A harness is removably attachable to the rod. The harness is configured to be worn by a worker using the frame-filler placement tool. With the worker wearing the harness and with the frame-filler placement tool removably attached to the harness, a portion of the weight of the frame-filler placement tool is suspended from the worker by the harness, making it easier for the worker to manipulate the frame-filler placement tool.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

Further features of the ergonomic frame-filler placement tool for manual installation of frame-filler material are set forth in the following detailed description and drawing figures.

DETAILED DESCRIPTION

Figure 1:
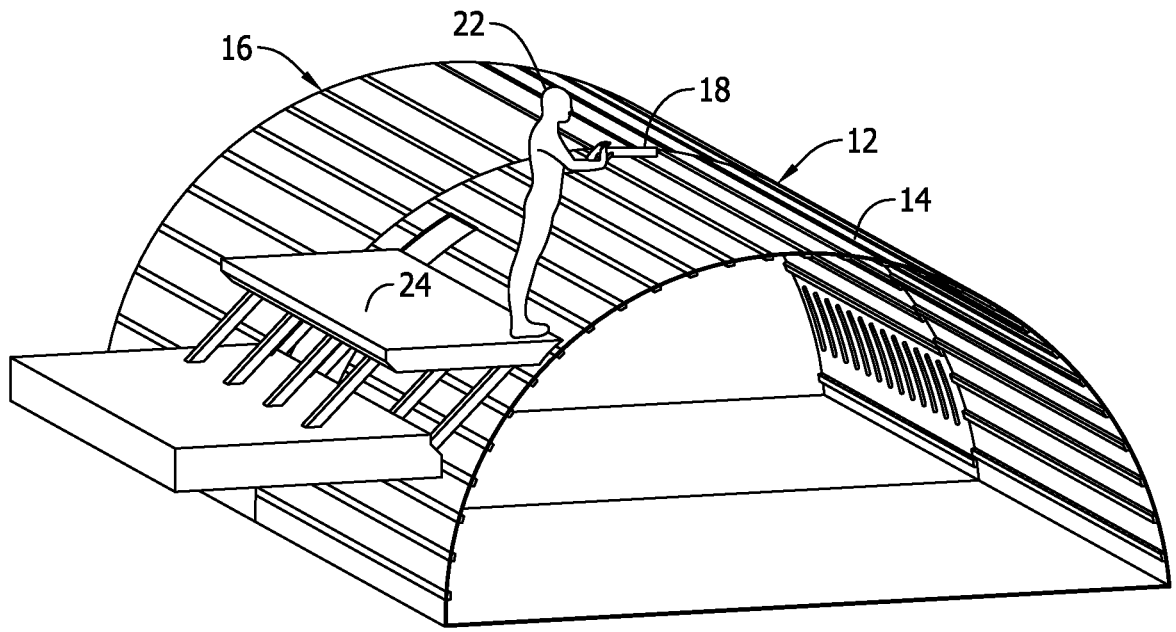
FIG. 1 is a representation of a top perspective view of a fuselage mandrel.
Figure 2:
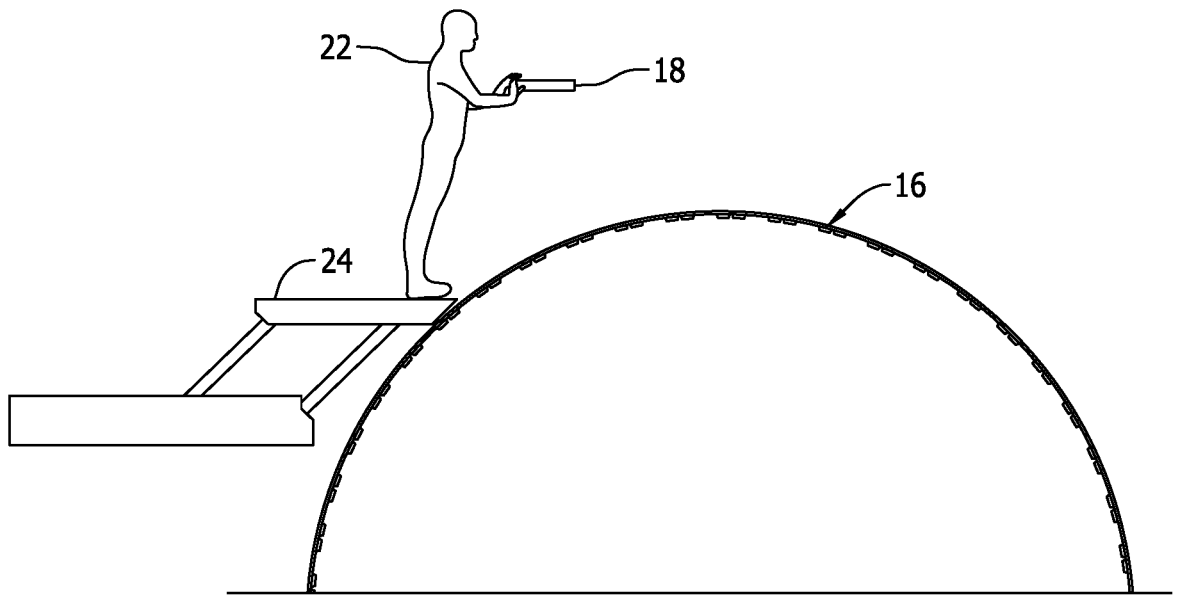
FIG. 2 is a representation of a side elevation view of the fuselage mandrel of FIG. 1.

The ergonomic frame-filler placement tool 32 for manual installation of frame-filler material is represented in FIGS. 3-6. The tool 32 is basically comprised of a rod 34 having an elongate length with a proximal end 36 at one end of the rod 34 and a distal end 38 at an opposite end of the rod 34. The rod 34 is constructed from a material that is light weight with sufficient strength and rigidity for the intended functioning of the rod 39, for example a plastic, a composite material, a metal such as aluminum, or other equivalent material. The rod 34 has an adjustable telescoping section 42 between the proximal end 36 and the distal end 38. The telescoping section 42 enables the length of the rod to be adjusted, with the proximal end 36 of the rod and the distal end 38 of the rod being movable together or toward each other to decrease the length of the rod 34, and with the proximal end 36 of the rod and the distal end 38 of the rod being movable apart or away from each other to increase the length of the rod 34. The rod 34 also has a bendable portion 44 adjacent the distal end 38 of the rod 34. The bendable portion 44 of the rod 34 operates in a manner similar to that of an adjustable gooseneck lamp where the bendable portion 44 can be manually set in a straight configuration or manually set in a bent configuration. The bendable portion 44 of the rod 34 enables the rod to be moved between a straight configuration where the proximal end 36 of the rod and the distal end 38 of the rod are aligned along a straight line through the rod 34, or in an adjustable bent configuration where the proximal end 36 of the rod 34 and the distal end 38 of the rod 34 are not aligned along the straight line through the rod. The rod 34 is represented in FIGS. 3-6 in the bent configuration of the rod 34.

Figure 4:
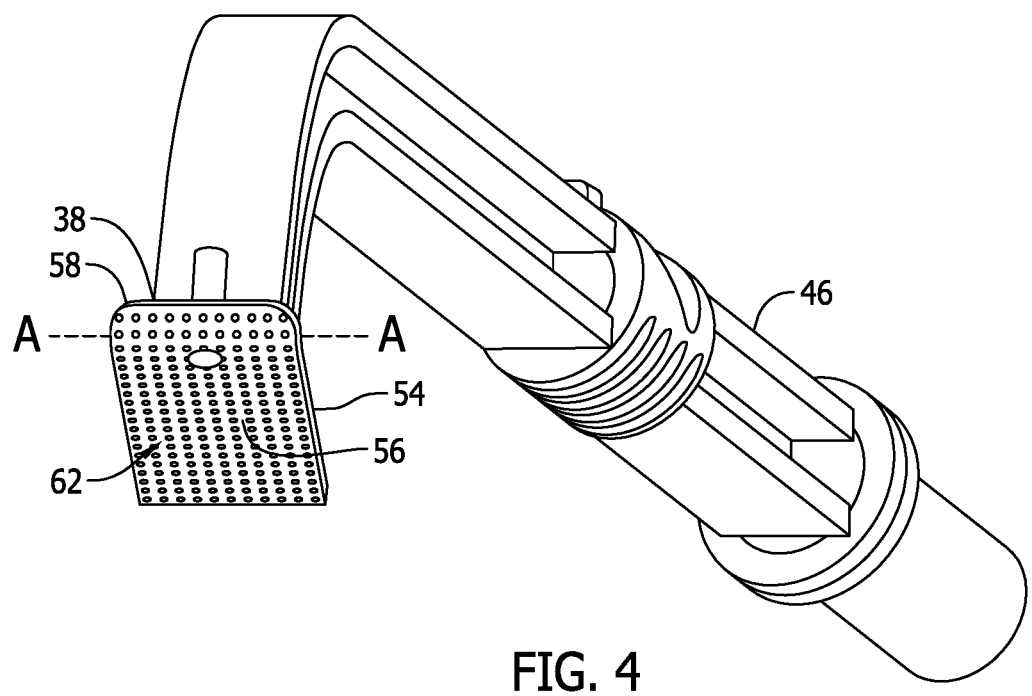
FIG. 4 is an enlarged view of a portion of the tool of FIG. 3.
Figure 5:
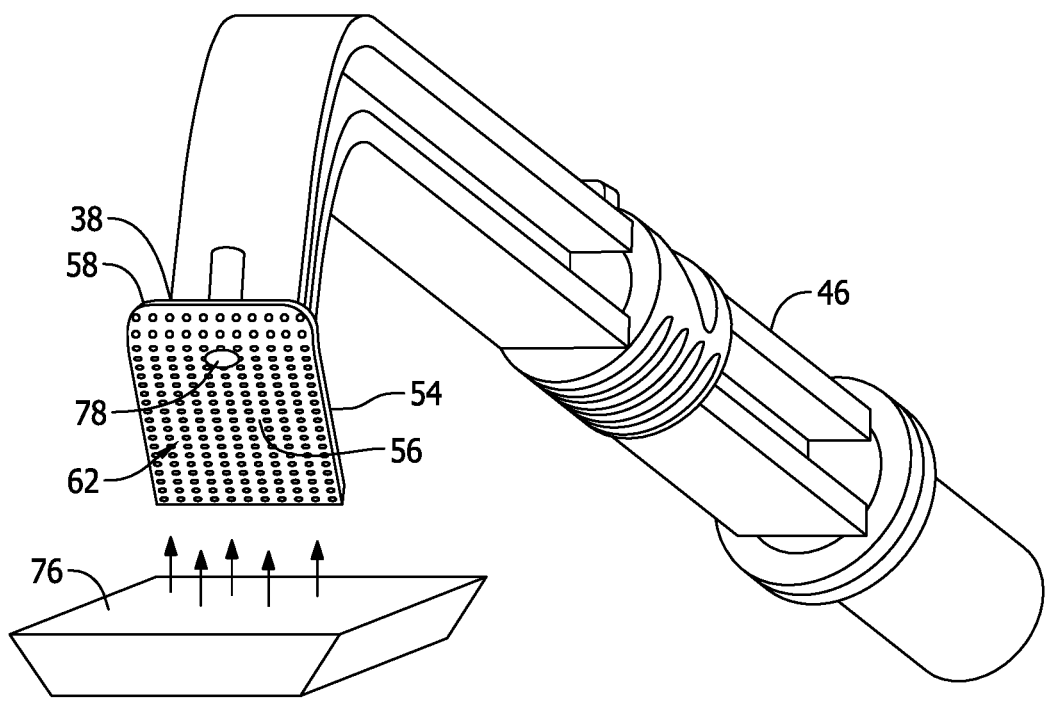
FIG. 5 is an enlarged, partial view of the tool of FIG. 4 and a piece of frame-filler material.

A conduit 46 extends along the length of the rod 34 between the proximal end 36 of the rod 34 and the distal end 38 of the rod 34. In the tool 32 of the disclosure, the conduit 46 extends through the center of the rod 34. A proximal end 48 of the conduit 46 is adjacent and emerges from the proximal end 36 of the rod 34 and a distal end 52 of the conduit 46 is adjacent and emerges from the distal end 38 of the rod 34. A portion of the conduit 46 through the center of the rod 34 is represented in FIGS. 4 and 5. The conduit could, alternatively, be a tube outside the rod 34 attached to the exterior of the rod 34 with the tube having a proximal end adjacent the proximal end 36 of the rod 34 and the tube having a distal end adjacent the distal end 38 of the rod 34. Other equivalent types of conduits could be employed on the tool 32. The conduit 46 provides a fluid flow path between the proximal end 36 of the rod 34 and the distal end 38 of the rod 34. The conduit 46 extends through the telescoping section 42 of the rod 34 and the bendable portion 44 of the rod 34.

A head 54 is mounted on the distal end 38 of the rod 34. The head 54 is attached to the distal end 38 of the rod 34 by a movable connection that enables the head 54 to be moved relative to the distal end 38 of the rod 34. For example, the head 54 could be attached to the distal end 38 of the rod 34 by a pivot connection that enables the head 54 to pivot about the axis A-A represented in FIG. 4. Other equivalent types of connections could be employed in attaching the head 54 to the distal end 38 of the rod 34. The head 54 has a hollow interior that communicates with the conduit 46 through the distal end 52 of the conduit 46. As represented in FIGS. 4 and 5, the head 54 has a flat, central surface 56 that is configured for engagement with a piece of frame-filler material. The head 54 has a general, rectangular configuration defined by a peripheral edge surface 58 adjacent the central surface 56. The peripheral edge surface 58 extends completely around the central surface 56 and defines the rectangular configuration of the head 54, The peripheral edge surface 58 has a curved configuration as represented in FIGS. 4 and 5 that curves away from the central surface 56 of the head 54 and toward the distal end 38 of the rod 34. There is at least one hole 62 through the surface 56 of the head 54. Preferably, there are a plurality of holes 62 through the central surface 56 of the head 54 that communicate with the hollow interior volume of the head 54 and communicate with the distal end 52 of the conduit 46.

Figure 3:
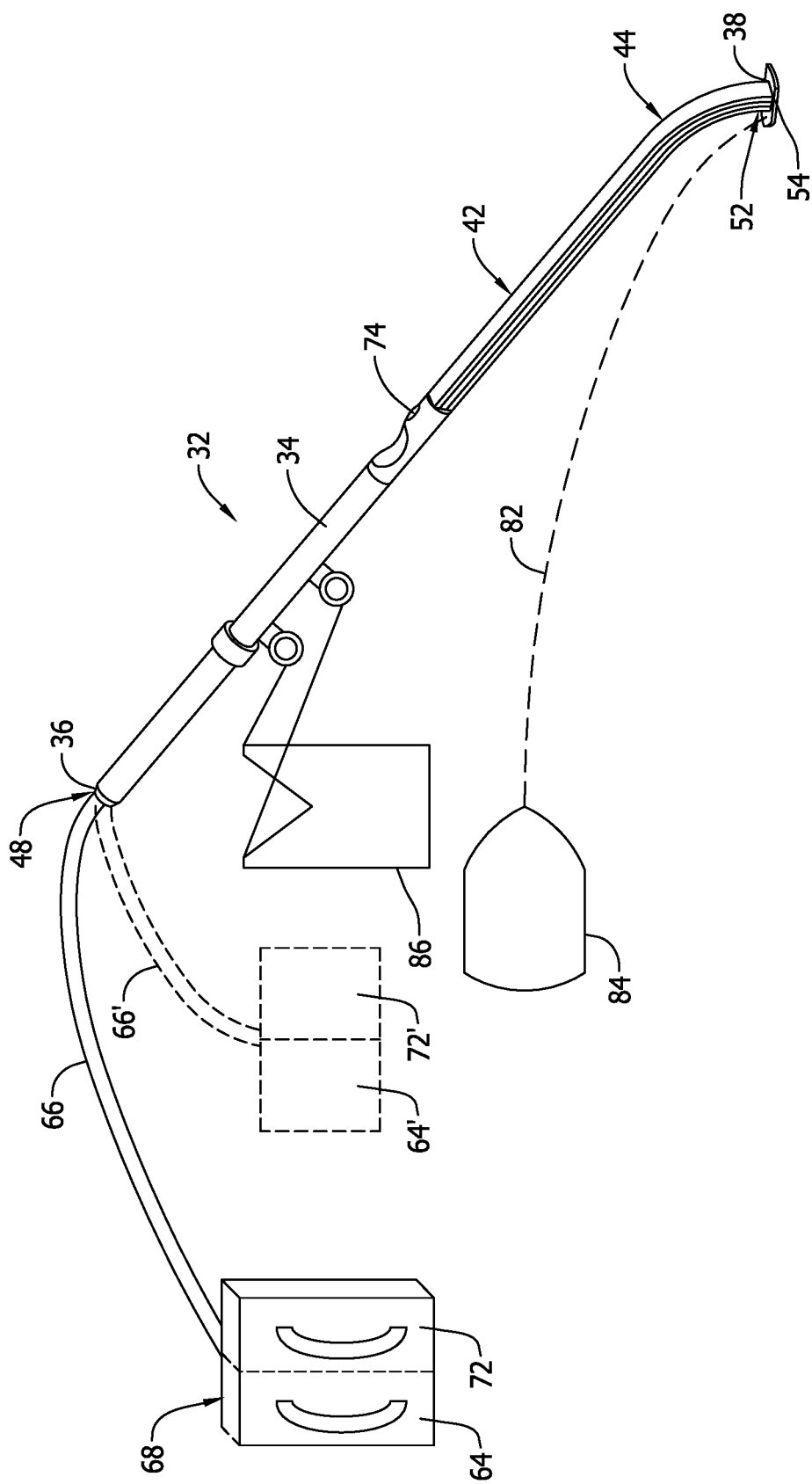
FIG. 3 is a representation of a top perspective view of the ergonomic frame-filler placement tool for manual installation of frame-filler material of this disclosure.

A source of vacuum pressure 64 communicates with the proximal end 48 of the conduit 46 through a length of flexible hose 66. As represented in FIG. 3, the source of vacuum pressure 64 is a vacuum air pump in a backpack assembly 68 that can be worn by a worker using the tool 32. Alternatively, the source of vacuum pressure 64' could be a vacuum air pump that is located in the general environment of a worker using the tool 32 that communicates with the proximal end 48 of the conduit 46 through a length of flexible hose 66'. The source of vacuum pressure 64, 64' is operable to supply vacuum pressure to the proximal end 48 of the conduit 46 through the flexible length of hose 66, 66'. The vacuum pressure supplied to the proximal end 48 of the conduit 46 creates a vacuum fluid flow into the distal end 52 of the conduit 46. The vacuum fluid flow into the distal end 52 of the conduit 46 in turn creates a vacuum fluid flow into and through the plurality of holes 62 through the central surface 56 of the head 54. The source of vacuum pressure 64, 64' is also operable to stop the supply of vacuum pressure to the proximal end 48 of the conduit 46. This stops the vacuum fluid flow into the distal end 52 of the conduit 46 which in turn stops the vacuum fluid flow into and through the plurality of holes 62 through the central surface 56 of the head 54.

A source of fluid pressure 72 also communicates with the proximal end 48 of the conduit 46 through the length of flexible hose 66. The source of fluid pressure could be an air pressure pump that is also provided in the backpack 68 that can be worn by a worker using the tool 32. Alternatively, the air pressure pump of the source of fluid pressure 72' could be located in the general environment of the worker using the tool 32, but separated from the worker and communicating with the proximal end 48 of the conduit 46 through a length of flexible hose 66'. The source of fluid pressure 72, 72' is operable to supply fluid pressure to the proximal end 48 of the conduit 46. This creates a fluid flow out of the distal end 52 of the conduit 46 and out of the plurality of holes 62 through the central surface 56 of the head 54.

A control device 74 is provided on the rod 34 between the proximal end 36 of the rod 34 and the distal end 38 of the rod 34. More accurately, the control device 74 is located on the rod 34 between the proximal end 36 of the rod 34 and the telescoping section 42 of the rod 34. The control device 74 communicates with the source of vacuum pressure 64, 64' and with the source of fluid pressure 72, 72', The control device 74 is operable to selectively control communication of the source of vacuum pressure 64, 64' with the proximal end 48 of the conduit 46 and with the plurality of holes 62 through the central surface 56 of the head 54, and communication of the source of fluid pressure 72, 72' with the proximal end 48 of the conduit 46 and the plurality of holes 62 through the central surface 56 of the head 54. The control device is also operable to stop the supply of vacuum pressure from the source of vacuum pressure 64, 64' to the proximal end 48 of the conduit 46 and stop the vacuum fluid flow into the distal end 52 of the conduit 46 and through the plurality of holes 62 through the central surface 56 of the head 54.

Figure 6:
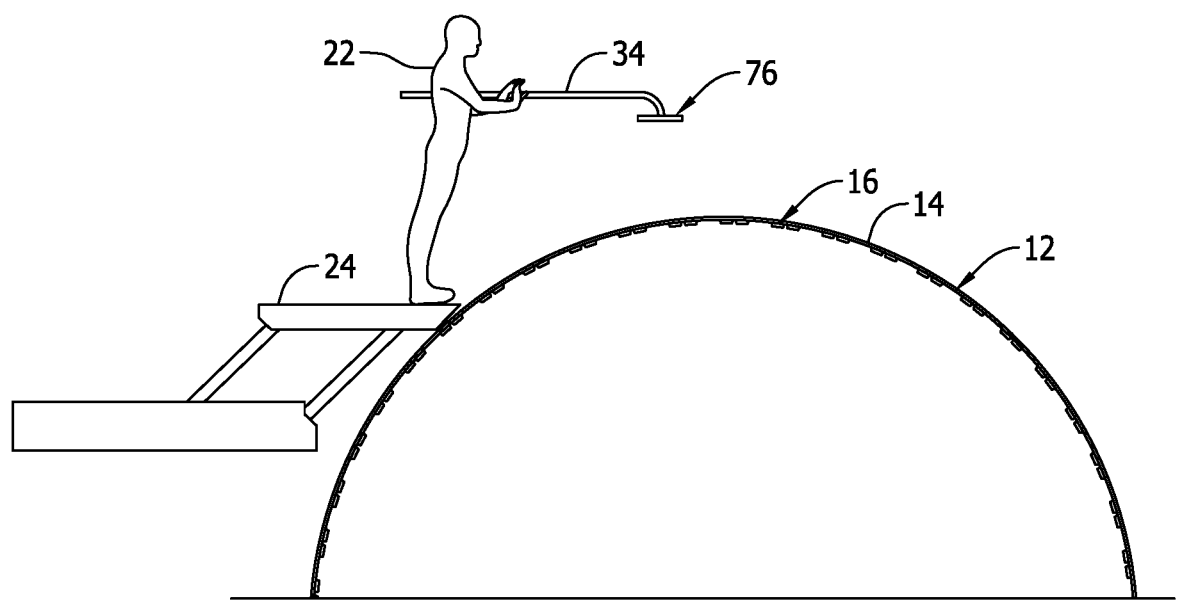
FIG. 6 is a representation of a side elevation view of the fuselage mandrel, similar to that of FIG. 2, and showing a representation of a worker manipulating the frame-filler placement tool for a manual installation of a piece of frame-filler material at a desired location on a fuselage mandrel.

As represented in FIG. 5, when the central surface 56 of the head 54 is positioned proximate to a piece of frame-filler material 76, or is engaged with the piece of frame-filler material 76, operating the control device 74 to selectively control the source of vacuum pressure 64, 64' to supply vacuum pressure to the proximal end 48 of the conduit 46 creates a vacuum fluid flow through the conduit 46, into the distal end 52 of the conduit 46 and into the plurality of holes 62 through the central surface 56 of the head 54. The vacuum fluid flow into the plurality of holes 62 draws the piece of frame-filler material 76 to the central surface 56 of the head 54 and holds the piece of frame-filler material 76 to the central surface 56 of the head 54. This is represented in FIGS. 5 and 6. A worker 22 can then manipulate the tool 32 to position the frame-filler material 76 over a desired location on the exterior surface 14 of the fuselage mandrel 12 to place the frame-filler material 76 at the desired location. This is represented in FIG. 6. The worker 22 can then operate the control device 74 to selectively control the source of vacuum pressure 64, 64' to stop the supply of vacuum pressure to the proximal end 48 of the conduit 46, stopping the vacuum fluid flow through the conduit 46, stopping the vacuum fluid flow through the distal end 52 of the conduit 46 and through the plurality of holes 62 through the central surface 56 of the head 54. This releases the hold of the piece of frame-filler material 76 to the central surface 56 of the head 54 and enables the frame-filler material 76 to drop onto the desired location on the exterior surface 14 of the fuselage mandrel 12, The worker 22 can also operate the control device 74 to operate the source of fluid pressure 72, 72' to supply a fluid flow to the proximal end 48 of the conduit 46, through the conduit 46, through the distal end 52 of the conduit 46 and through the plurality of holes 62 through the central surface 56 of the head 54 to separate the frame-filler material 76 from the central surface 56 of the head 54 at the desired location on the exterior surface 14 of the fuselage mandrel 12. The worker 22 can further position the frame-filler material 76 at the desired location on the exterior surface 14 of the fuselage mandrel 12 by manipulating the frame-filler material 76 with the central surface 56 of the head 54.

As represented in FIGS. 4 and 5, a camera 78 is supported on the rod 34 at the distal end 38 of the rod 34. More specifically, the camera 78 is mounted to the central surface 56 of the head 54. As represented schematically in FIG. 3, the camera 78 communicates by hardwiring, wi-fi, or other equivalent means 82 with a display screen 84. The camera 78 is operable to display on the display screen 84 images of the environment adjacent to the central surface 56 of the head 54. This enables a worker to view on the display screen 84 the position of a piece of frame-filler material 76 placed by the tool 32 on the surface 14 of the fuselage mandrel 12.

The tool 32 is also provided with a harness 86. The harness 86 is represented schematically in FIG. 3. The harness 86 is removably connectable to the rod 34 and is configured to be worn by the worker 22 that is manipulating the frame-filler placement tool 32. The harness 86 suspends the rod 34 from the shoulders of the worker 22 and effectively reduces the weight of the rod 34 being manipulated by the worker 22. Other equivalent means could be used to support a portion of the weight of the rod 32 and thereby reduce the portion of the weight of the rod 34 being manipulated by the worker 22.

As various modifications could be made in the construction of the frame-filler placement tool 32 and its method of operation herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. A frame filler placement tool comprising:
 a rod, the rod having a proximal end, a distal end, a length between the proximal end and the distal end, and a telescoping section that enables the length of the rod to be adjusted;
 a conduit, the conduit extending along the rod between the proximal end of the rod and distal end of the rod, the conduit having a proximal end adjacent the proximal end of the rod and a distal end adjacent the distal end of the rod;
 a source of vacuum pressure, the source of vacuum pressure communicating with the proximal end of the conduit, the source of vacuum pressure being operable to supply vacuum pressure to the proximal end of the conduit and create a vacuum fluid flow into the distal end of the conduit, and the source of vacuum pressure being operable to stop the supply of vacuum pressure to the proximal end of the conduit and stop vacuum fluid flow into the distal end of the conduit; and,
 a head on the distal end of the rod, the head having a surface that is configured for engagement with a piece of frame filler material, a hole through the surface of the head, the hole communicating with the distal end of the conduit whereby when the surface of the head is engaged with a piece of frame filler material, operating the source of vacuum pressure to supply vacuum pressure to the proximal end of the conduit and create a vacuum fluid flow into the distal end of the conduit creates a vacuum fluid flow into the hole through the head which holds the piece of frame filler material to the surface of the head, and operating the source of vacuum pressure to stop the supply of vacuum pressure to the proximal end of the conduit and stop the vacuum fluid flow into the hole through the head releases the hold of the piece of frame filler material to the surface of the head;
 wherein the head is attached to the distal end of the rod by a moveable connection arranged between the telescoping section and the head and configured to pivot the head relative to the distal end of the rod.

2. The frame filler placement tool of claim 1, further comprising:
 the hole through the surface of the head is one of a plurality of holes through the surface of the head, the plurality of holes through the surface of the head communicating with the distal end of the conduit.

3. The frame filler placement tool of claim 2, further comprising:
 the head having a flat central surface configured for engagement with the piece of frame filler material and a peripheral edge surface extending around the flat central surface and defining a rectangular configuration of the head, wherein the peripheral edge surface has a curvature that curves away from the flat central surface of the head toward the distal end of the rod.

4. The frame filler placement tool of claim 1, further comprising:
 a control device, the control device communicating with the source of vacuum pressure, the control device being operable to selectively supply vacuum pressure to the proximal end of the conduit and create a vacuum fluid flow into the hole through the head, and stop the supply of vacuum pressure to the proximal end of the conduit and stop the vacuum fluid flow through the hole through the head; and,
 the control device being on the rod.

5. The frame filler placement tool of claim 1, further comprising:
 the rod having a bendable portion adjacent the distal end of the rod, the bendable portion enabling the rod to be moved between a straight configuration where the proximal end of the rod and the distal end of the rod are aligned along a straight line through the rod, and a bent configuration where the proximal end of the rod and the distal end of the rod are not aligned along the straight line through the rod.

6. The frame filler placement tool of claim 3, further comprising:
 a camera mounted to the central surface of the head, the camera communicating with a display screen, the camera being operable to display images on the display screen of an environment adjacent the central surface of the head.

7. The frame filler placement tool of claim 1, further comprising:
 a harness connected to the rod, the harness being configured to be worn by an operator of the frame filler placement tool and suspend the frame filler placement tool on the operator.

8. A frame filler placement tool comprising:
 a rod, the rod having a proximal end, a distal end, a length between the proximal end and the distal end, and a telescoping section that enables the length of the rod to be adjusted;
 a conduit, the conduit extending along the rod between the proximal end of the rod and the distal end of the rod, the conduit having a proximal end adjacent the proximal end of the rod and a distal end adjacent the distal end of the rod;
 a head on the distal end of the rod, a hole through the head, the hole communicating with the distal end of the conduit, wherein the head is attached to the distal end of the rod by a moveable connection arranged between the telescoping section and the head and configured to pivot the head relative to the distal end of the rod;
 a source of vacuum pressure, the source of vacuum pressure communicating with the proximal end of the conduit, the source of vacuum pressure being operable to supply vacuum pressure to the proximal end of the conduit and create a vacuum fluid flow into the hole through the head; and, a source of fluid pressure, the source of fluid pressure communicating with the proximal end of the conduit, the source of fluid pressure being operable to supply fluid pressure to the proximal end of the conduit and create a fluid flow out of the hole through the head.

9. The frame filler placement tool of claim 8, further comprising:
a control device, the control device communicating with the source of vacuum pressure and the source of fluid pressure, the control device being operable to selectively control communication of the source of vacuum pressure with the proximal end of the conduit and communication of the source of fluid pressure with the proximal end of the conduit.

10. The frame filler placement tool of claim 9, further comprising:
the control device being on the rod between the proximal end of the rod and the distal end of the rod.

11. The frame filler placement tool of claim 8, further comprising:
the hole through the head is one of a plurality of holes through the head, the plurality of holes communicating with the distal end of the conduit.

12. The frame filler placement tool of claim 11, further comprising:
the head having a central surface configured for engagement with a piece of frame filler material, the central surface of the head being flat, the head having a peripheral edge surface extending around the central surface and defining a rectangular configuration of the head, wherein the peripheral edge surface has a curvature that curves away from the central surface of the head toward the distal end of the rod.

13. The frame filler placement tool of claim 8, further comprising:
the rod having a bendable portion adjacent the distal end of the rod.

14. The frame filler placement tool of claim 8, further comprising:
a camera mounted to the central surface of the head, the camera communicating with a display screen, the camera being operable to display on the display screen images of an environment adjacent the central surface of the head.

15. A method of positioning a piece of frame filler material on a mandrel, the method comprising:

supplying vacuum pressure to a rod having a proximal end, a distal end, a length between the proximal end and the distal end, and a telescoping section that enables the length of the rod to be adjusted, and having a head on the distal end of the rod with a hole through the head, the supply of vacuum pressure creating a vacuum fluid flow into the hole through the head, wherein the head is attached to the distal end of the rod by a moveable connection arranged between the telescoping section and the head and configured to pivot the head relative to the distal end of the rod;

positioning the head against a piece of frame filler material where the vacuum fluid hole into the hole through the head holds the piece of frame filler material to the head;

moving the rod to position the distal end of the rod and the piece of frame filler material held to the head at the distal end of the rod to a selected position on a mandrel; and, stopping the supply of vacuum pressure to the rod and stopping the vacuum fluid flow into the hole through the head releasing the piece of frame filler material from being held to the head and thereby positioning the piece of frame filler material on the mandrel.

16. The method of claim 15, further comprising:
moving the rod to move the head at the distal end of the rod into engagement with the piece of frame filler material on the mandrel and moving the piece of frame filler material on the mandrel to a desired position on the mandrel.

17. The method of claim 15, wherein the head includes a flat central surface configured for engagement with the piece of frame filler material and a peripheral edge surface extending around the flat central surface and defining a rectangular configuration of the head, and wherein the peripheral edge surface has a curvature that curves away from the flat central surface of the head toward the distal end of the rod.

18. The method of claim 17, wherein a camera is mounted to the central surface of the head and configured to communicate with a display screen and operable to display images on the display screen of an environment adjacent the central surface of the head;

further comprising:
displaying images on the display screen of the environment adjacent the central surface of the head when moving the head into engagement with the piece of frame filler material on the mandrel.

* * * * *